(12) United States Patent
Lim et al.

(10) Patent No.: US 7,881,014 B2
(45) Date of Patent: Feb. 1, 2011

(54) PATTERNED MAGNETIC RECORDING MEDIUM HAVING REDUCED MAGNETIC INTERACTION BETWEEN NEIGHBORING MAGNETIC RECORDING LAYERS

(75) Inventors: Chee-kheng Lim, Yongin-si (KR); Jin-seung Sohn, Yongin-si (KR); Byung-kyu Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 913 days.

(21) Appl. No.: 11/755,765

(22) Filed: May 31, 2007

(65) Prior Publication Data
US 2008/0106821 A1 May 8, 2008

(30) Foreign Application Priority Data
Nov. 3, 2006 (KR) .................... 10-2006-0108391

(51) Int. Cl.
*G11B 5/82* (2006.01)
(52) U.S. Cl. ..................... 360/135
(58) Field of Classification Search .......... 360/135
See application file for complete search history.

(56) References Cited
U.S. PATENT DOCUMENTS

| | | | |
|---|---|---|---|
| 3,655,441 A * | 4/1972 | Kefalas | 360/134 |
| 5,583,727 A * | 12/1996 | Parkin | 360/324 |
| 6,947,235 B2 * | 9/2005 | Albrecht et al. | 360/55 |
| 7,550,210 B2 * | 6/2009 | Berger et al. | 428/828 |
| 2006/0177703 A1 | 8/2006 | Takenoiri et al. | |
| 2010/0075178 A1 * | 3/2010 | Jubert | 428/800 |

FOREIGN PATENT DOCUMENTS

| | | |
|---|---|---|
| CN | 1624771 | 6/2005 |
| CN | 1734565 A | 2/2006 |
| KR | 10-2005-0053496 A | 6/2005 |

OTHER PUBLICATIONS

Korean Office Action, Nov. 27, 2007.*

* cited by examiner

*Primary Examiner*—Julie Anne Watko
(74) *Attorney, Agent, or Firm*—Sughrue Mion, PLLC

(57) ABSTRACT

A patterned magnetic recording medium including a plurality of magnetic recording domains arranged at predetermined regular intervals on a substrate, wherein the magnetic recording domains are multi-layered and comprise a soft magnetic layer interposed between a first ferromagnetic layer and a second ferromagnetic layer. The soft magnetic layer suppresses magnetic interaction between a respective one of the magnetic recording domains and neighboring ones of the magnetic recording domains.

14 Claims, 3 Drawing Sheets

PATTERNED MAGNETIC RECORDING MEDIUM HAVING REDUCED MAGNETIC INTERACTION BETWEEN NEIGHBORING MAGNETIC RECORDING LAYERS

CROSS-REFERENCE TO RELATED PATENT APPLICATION

This application claims the benefit of Korean Patent Application No. 10-2006-0108391, filed on Nov. 3, 2006 in the Korean Intellectual Property Office, the disclosure of which is incorporated herein in its entirety by reference.

BACKGROUND OF THE INVENTION

1. Field of the Invention

The present invention relates to recording medium, and more particularly, to a patterned magnetic recording medium having reduced interaction between neighboring magnetic recording layers.

2. Description of the Related Art

In continuous magnetic recording media (hereinafter referred to as 'continuous media') in which a continuous magnetic film is used as a recording layer, the size of magnetic grains consisting the magnetic film should be small in order to increase the recording density of the continuous media. However, when the magnetic grain size is smaller than a critical value, a superparamagnetic effect occurs, and thus thermal stability of the magnetic grains is decreased, such that the data storage characteristics of the continuous media are deteriorated. Thus it is difficult to increase the recording density of the continuous media.

In order to overcome the limit of the recording density of the continuous media, patterned magnetic recording media (hereinafter referred to as 'patterned media') in which magnetic domains corresponding to bit regions are separated from each other have been suggested. The patterned media are disclosed in U.S. Patent Application No. US 2002/0068195 A1 and No. 2002/0154440 A1, and in Korean Patent Laid-Open Gazette No. 2005-0010338. The recording density of the patterned media is known to be 1000 Gbit/in$^2$ or greater, which is significantly greater than that of the continuous media.

However, since magnetic interaction between neighboring magnetic domains is large in conventional patterned media, the switching field distribution is increased. Hereinafter, the above problem will be described in detail with reference to FIGS. 1A and 1B.

FIG. 1A is a cross-sectional view of a conventional patterned medium.

Referring to FIG. 1A, the conventional patterned medium includes a plurality of magnetic recording layers 100a through 100g (100) on a substrate 10. The magnetic recording layers 100a through 100g are disposed at a regular interval and are formed of a ferromagnetic material. Each magnetic recording layer is in the form of a pillar, and a non-magnetic boundary layer 150 is formed between the magnetic recording layers 100a through 100g.

Each magnetic recording layer is a bit region in which data is recorded. Each magnetic recording layer is magnetized in a first direction D1 by a magnetic field generated by a recording head, or is magnetized in a second direction D2, which is opposite to the first direction D1. The magnetic recording layer magnetized in the first direction D1 and the magnetic recording layer magnetized in the second direction D2 may correspond respectively to a bit value of 0 (hereinafter, '0') and a bit value of 1 (hereinafter, '1'). To record new data to the magnetic recording layer 100 which contains pre-recorded data, the magnetization direction of the magnetic recording layer 100 may need to be reversed. A magnetic field needed to reverse the magnetization direction is called a switching magnetic field.

Ideally, the absolute value of the switching magnetic field to record '0' and absolute value of the switching magnetic field to record '1' are equal, and the switching field distribution should be zero. However, in a conventional patterned medium, the switching magnetization distribution is greater than zero due to magnetic interaction between neighboring magnetic domains.

For example, in FIG. 1A where the magnetic recording layers 100a through 100g are all magnetized in the first direction D1, the absolute value of the switching magnetic field to reverse the magnetization direction of the magnetic recording layer 100d is smaller than the absolute value of the switching magnetic field needed to return the magnetization direction of the magnetic recording layer 100d to the first direction D1 again. The reason is that a magnetic field $H_i$, which is generated from magnetic recording layers 100a through 100c and 100e through 100g, which are located at the sides of the magnetic recording layer 100d, affects the magnetic recording layer 100d. In detail, when the magnetic recording layers 100a through 100c and 100e through 100g have the same magnetization direction (here, it is the first direction D1) as the magnetic recording layer 100d, the magnetic field $H_i$ generated from the magnetic recording layers 100a through 100c and 100e through 100g and passing through the magnetic recording layer 100d has the second direction D2, which is opposite to the first direction D1. Thus the absolute value of the switching magnetic field to change the magnetization direction of the magnetic recording layer 100d from the first direction D1 to the second direction D2 is smaller than the absolute value of the switching magnetic field to change the magnetization direction of the magnetic recording layer 100d from the second direction D2 to the first direction D1.

FIG. 1B illustrates the hysteresis characteristic caused by a magnetic field H applied to the magnetic recording layer 100d. In FIG. 1B, M denotes the magnetization of the magnetic recording layer 100d.

Referring to FIG. 1B, the hysteresis loop of the magnetic recording layer 100d is largely off-set to the right. Thus the difference between the absolute value of a switching magnetic field H1 for recording '0' and the absolute value of a switching magnetic field H2 for recording '1' is large.

The magnetization direction of the magnetic recording layers 100a through 100c and 100e through 100g may vary at different areas of a recording medium. Thus the difference between the absolute value of a switching magnetic field H1 for recording '0' and the absolute value of a switching magnetic field H2 for recording '1' also may vary at various areas of the recording medium.

The switching field distribution (%) is calculated by $(\Delta H/H_{min}) \times 100$, where $\Delta H$ denotes $\||H1|-|H2|\|$, and $H_{min}$ is the smaller value of |H1| and |H2|. When the magnetic anisotropic energy of the magnetic recording layer 100 is $2 \times 10^6$ erg/cm$^3$, and $4\pi$Ms is 1.0 Tesla, where Ms denotes saturation magnetization and one bit is switched by one time of application of a magnetic field, the switching magnetic distribution of a conventional patterned medium is 70%, which is significantly high.

Accordingly, it is difficult to secure recording reliability and data stability in conventional patterned media.

SUMMARY OF THE INVENTION

The present invention provides a patterned magnetic recording medium having reduced magnetic interaction between neighboring magnetic domains.

According to an aspect of the present invention, there is provided a patterned magnetic recording medium comprising a plurality of magnetic recording layers arranged at an interval on a substrate, wherein the magnetic recording layers are a multi-layer laminate which is disposed vertically with respect to the substrate and comprise a means which suppresses magnetic interaction between the respective magnetic recording layers.

The magnetic recording layers each may comprise two or more ferromagnetic layers and the means which suppresses magnetic interaction is interposed between the respective ferromagnetic layers, the means being a soft magnetic layer.

Each magnetic recording layer may comprise a first ferromagnetic layer, the soft magnetic layer, and a second ferromagnetic layer sequentially stacked.

A non-magnetic layer may be formed between the first ferromagnetic layer and the soft magnetic layer and between the soft magnetic layer and the second ferromagnetic layer.

The magnetic anisotropic energy of the ferromagnetic layers may be $10^6$-$10^7$ erg/cm$^3$.

The thickness of the ferromagnetic layers may be 2-10 nm.

The ferromagnetic layers may be each one of a CoCrPt layer, a CoPtP layer, a multi-layer comprising a Co layer and a Pt layer, and another multi-layer comprising a Fe layer and a Pt layer.

The magnetic anisotropic energy of the soft magnetic layer may be 50-10000 erg/cm$^3$.

The thickness of soft magnetic layer may be 2-10 nm.

The soft magnetic layer may be one of a CoFe layer, a NiFe layer, a CoNiFe layer, and a Co layer.

4 πMs may be 0.3-1.5 Tesla, where Ms is the saturation magnetization of the soft magnetic layer.

The thickness of the non-magnetic layer may be 1-5 nm.

The non-magnetic layer may be one of a Cu layer, a Pt layer, a Ru layer, a Ta layer, an NiFeCr layer, and a Cr layer.

According to the present invention, the magnetic interaction between neighboring magnetic recording layers can be reduced, thereby reducing the switching field distribution of the patterned magnetic recording medium. Thus the recording reliability and the data stability can be increased.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
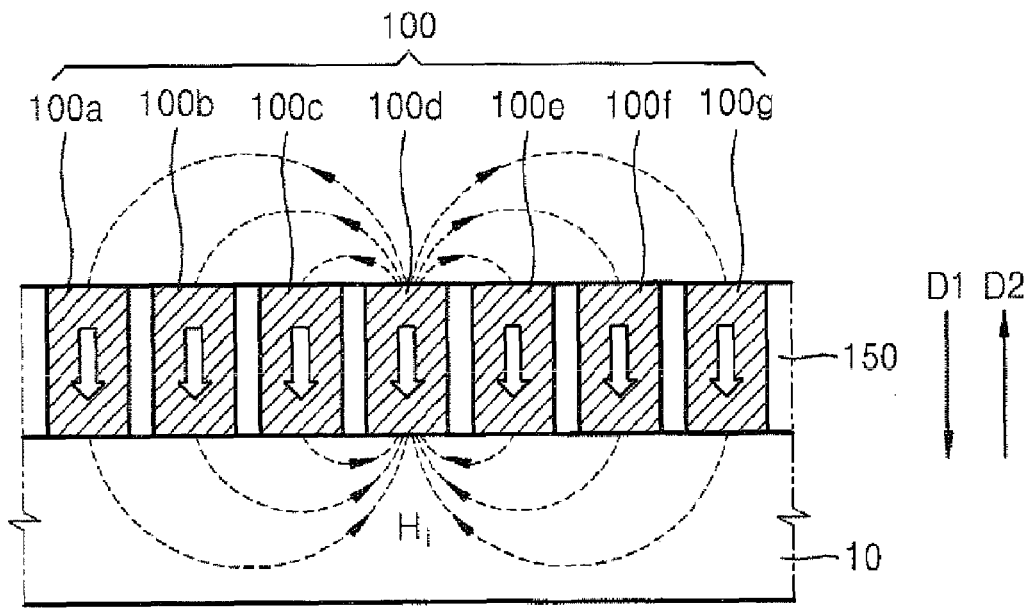
FIG. 1A is a cross-sectional view illustrating a structure of a conventional patterned magnetic recording medium and the problem thereof.
Figure 1B:
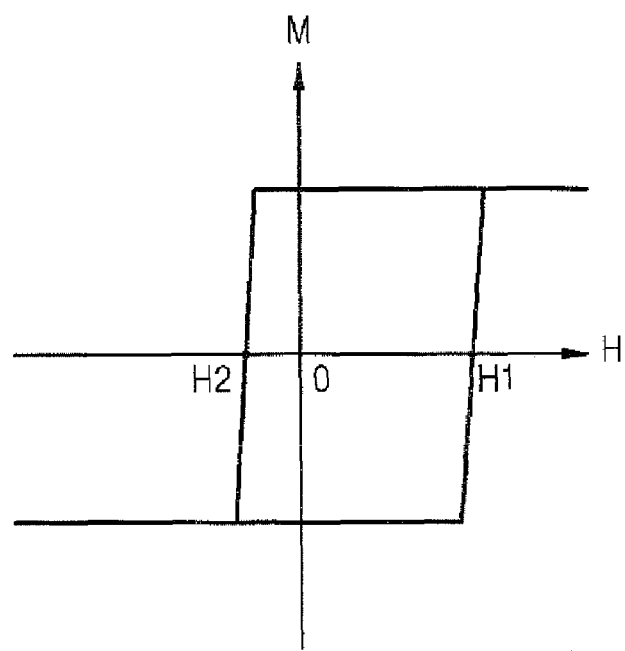
FIG. 1B is a graph illustrating the hysteresis characteristic of a magnetic recording layer included in the patterned magnetic recording medium of FIG. 1A.

The present invention will now be described more fully with reference to the accompanying drawings, in which exemplary embodiments of the invention are shown. In the drawings, the widths or the thicknesses of layers and regions are exaggerated for clarity.

Figure 2:
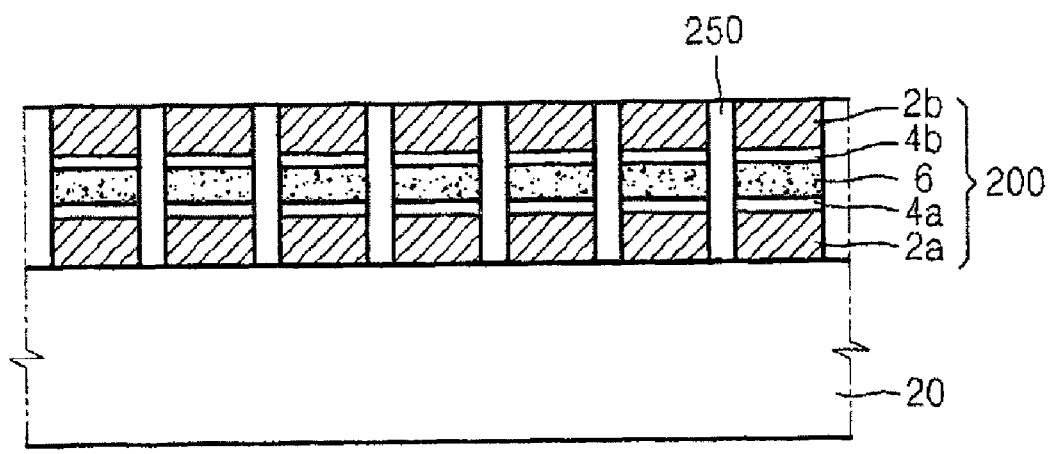
FIG. 2 is a cross-sectional view of patterned magnetic recording medium according to an embodiment of the present invention.

FIG. 2 is a cross-sectional view of a patterned magnetic recording medium according to an embodiment of the present invention.

Referring to FIG. 2, the patterned magnetic recording medium according to the current embodiment of the present invention includes a plurality of magnetic recording layers 200 arranged on a substrate 20 at an interval. In one embodiment, the magnetic recording layers 200 are disposed at a regular interval. Each of the magnetic recording layers 200 is a multi-layer laminate comprising. It has a sandwich structure in which a soft magnetic layer 6 is interposed between a first ferromagnetic layer 2a and a second ferromagnetic layer 2b. A first non-magnetic layer 4a and a second non-magnetic layer 4b may be formed between the first ferromagnetic layer 2a and the soft magnetic layer and between the soft magnetic layer 6 and the second ferromagnetic layer 2b, respectively. A non-magnetic boundary layer 250 is provided between each of the magnetic recording layers 200. The magnetic anisotropic energy of the first and second ferromagnetic layers 2a and 2b may be $10^6$-$10^7$ erg/cm$^3$. The magnetic anisotropic energy of the soft magnetic layer 6 may be 50-10000 erg/cm$^3$, and preferably 80-1000 erg/cm$^3$.

The first and second ferromagnetic layers 2a and 2b may be formed of a same material or different material, and each may be one of a CoCrPt layer, a CoPtP layer, a multi-layer comprising a Co layer and a Pt layer, and another multi-layer comprising a Fe layer and a Pt layer. The soft magnetic layer 6 may be one of a CoFe layer, a NiFe layer, a CoNiFe layer, and a Co layer. The first and second non-magnetic layers 4a and 4b may be formed of a same material or different material, and each may be one of a Cu layer, a Pt layer, a Ru layer, a Ta layer, a NiFeCr layer, and a Cr layer.

The thickness of the first and second ferromagnetic layers 2a and 2b may be 2-10 nm, and the thickness of the soft magnetic layer 6 may be 2-10 nm. The thickness of the first and second non-magnetic layers 4a and 4b may be 1-5 nm.

The non-magnetic boundary layer 250 may be formed of a material such as a resin, silicon oxide (SiO$_2$), or silicon nitride (Si$_x$N$_y$) using a nano patterning method such as nano imprinting. The non-magnetic boundary layer 250 may be a vacant layer, that is, an air layer. When the non-magnetic boundary layer 250 is formed of a material such as a resin, the first ferromagnetic layer 2a, the first non-magnetic layer 4a, the soft magnetic layer 6, the second non-magnetic layer 4b, and the second ferromagnetic layer 2b are sequentially filled between the non-magnetic boundary layers 250 to form the magnetic recording layers 200. The various methods and sequences of forming the magnetic recording layers 200 and the non-magnetic boundary layers 250 are known in the art and proper methods and sequences may de determined by the one skilled.

The patterned magnetic recording medium according to the current embodiment of the present invention has reduced magnetic interaction between the neighboring magnetic recording layers 200 due to the characteristics of the structure of the magnetic recording layers 200. The reason for the reduction in the magnetic interaction between the magnetic recording layers 200 will be described in detail with reference to FIGS. 3A and 3B.

Figure 3A:
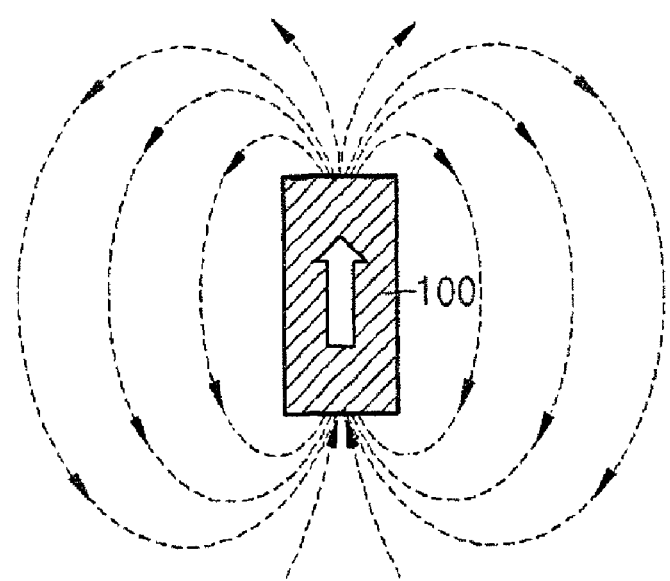
FIGS. 3A and 3B are cross-sectional views respectively illustrating the magnetic field caused in the magnetic recording layer included in a conventional patterned magnetic recording medium and a magnetic recording medium according to an embodiment of the present invention.
Figure 3B:
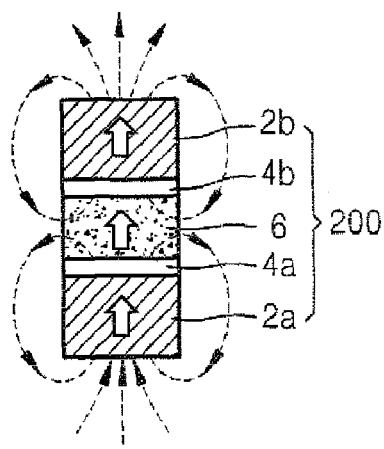

FIGS. 3A and 3B are cross-sectional views respectively illustrating the magnetic field caused in a magnetic recording layer (hereinafter 'conventional magnetic recording layer 100') included in a conventional patterned magnetic recording medium, and in the magnetic recording layer of the present invention (hereinafter 'magnetic recording layer 200') included in a magnetic recording medium according to an embodiment of the present invention.

In FIGS. 3A and 3B, the conventional magnetic recording layer 100 and the magnetic recording layer 200 according to the present invention are magnetized in a first direction D1. The directions of magnetization correspond to the directions shown in FIG. 1A.

Referring to FIGS. 3A and 3B, the magnetic field of the conventional magnetic recording layer 100 formed of a ferromagnetic layer is broadly distributed at a wide range of area around the conventional magnetic recording layer 100. On the other hand, the magnetic field of the magnetic recording layer 200 according to the present invention is distributed only near the magnetic recording layer 200 because the soft magnetic layer 6 interposed between the first and second ferromagnetic layers 2a and 2b absorbs the magnetic field in the middle of the magnetic recording layer 200. Accordingly, since the magnetic field generated by the first and second ferromagnetic layers 2a and 2b of the magnetic recording layer 200 mostly passes through the magnetic recording layer 200, the magnetic interaction between neighboring magnetic recording layers 200 in the patterned magnetic recording medium according to the present invention is significantly reduced.

Also, as the magnetization reversion speed of the soft magnetic layer 6 during switching is higher than the magnetization reversion speed of the first and second ferromagnetic layers 2a and 2b, the soft magnetic layer 6 functions as an initiator for magnetic reversion of the magnetic recording layer 200. Thus the switching speed of the magnetic recording layer 200 is increased.

Meanwhile, the first and second non-magnetic layers 4a and 4b prevent a formation of a magnetic domain wall between the first ferromagnetic layer 2a and the soft magnetic layer 6 and between the ferromagnetic layer 2b and the soft magnetic layer 6, respectively, so that the magnetic recording layer 200 acts like a single magnetic domain. When the magnetic recording layer 200 acts like a single magnetic domain, excessive decrease in the magnetic field required for reversing the magnetic recording layer 200, that is, the switching magnetic field, is prevented.

Figure 4:
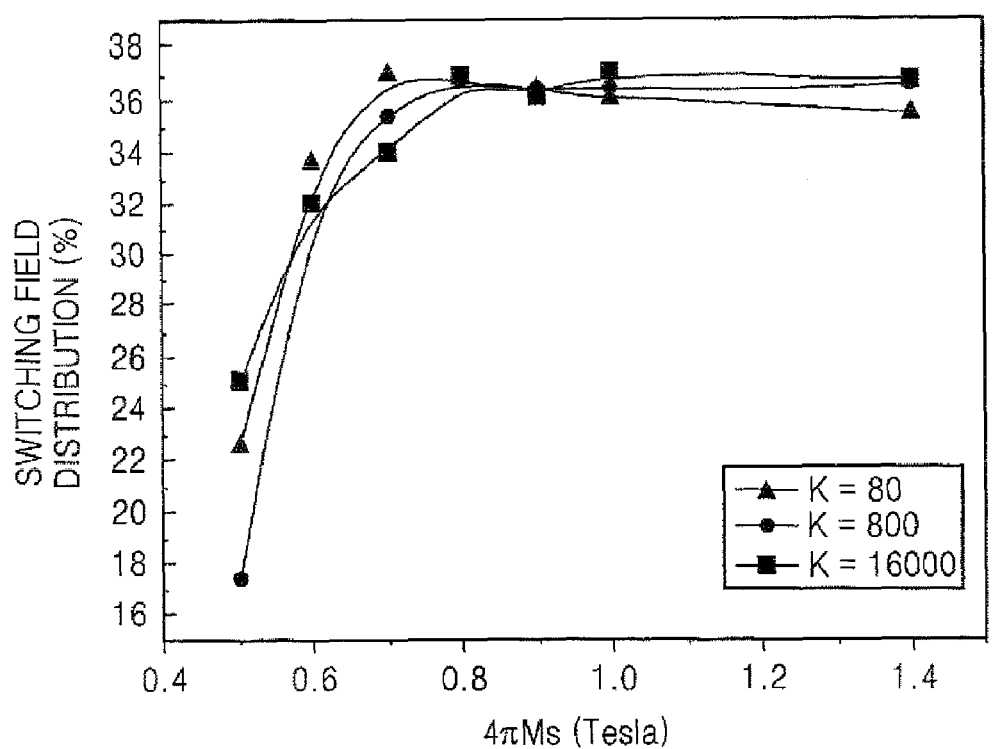
FIG. 4 is a graph illustrating the simulation result of switching field distribution of the patterned magnetic recording medium of FIG. 2.

FIG. 4 is a graph illustrating the results of a simulated switching field distribution of the patterned magnetic recording medium according to the present invention illustrated in FIG. 2, showing the variation of the switching field distribution of the magnetic recording layer 200 according to the change of magnetic characteristics of the soft magnetic layer 6. In FIG. 4, Ms denotes saturation magnetization, and K denotes the magnetic anisotropic energy of the soft magnetic layer 6 (erg/cm$^3$).

It shows the switching field distribution of the magnetic recording layer 200 calculated by varying 4 πMs of the soft magnetic layer 6 from 0.5 to 1.4 Tesla when K is each 80, 800, and 16000 erg/cm$^3$.

For the purpose of tests, all the magnetic recording layers 200 in a patterned magnetic recording medium were magnetized in a first direction D1 and a predetermined magnetic recording layer was subject to a reverse magnetization to a second direction D2. In the simulation, one bit is switched by one time of application of a magnetic field.

Referring to FIG. 4, the maximum switching field distribution of the magnetic recording layer 200 is less than 38%, and the switching field distribution of the magnetic recording layer 200 may be decreased to less than 20% in a region where 4 πMs is smaller than 0.6 Tesla. As can be seen from FIG. 4, 4 πMs of the soft magnetic layer 6 of the patterned magnetic recording medium according to the present invention is 0.3-1.5 Tesla, preferably 0.3-0.7 Tesla.

Comparing FIG. 4 with the calculation result shown in 'Description of the Related Art' of the switching field distribution of the conventional patterned magnetic recording medium, the switching field distribution of the patterned magnetic recording medium according to an embodiment of the present invention is significantly smaller than that of the conventional patterned magnetic recording medium.

A particular embodiment of a magnetic recording layer having two ferromagnetic layers and a soft magnetic layer interposed between the two ferromagnetic layers has been explained above. However, the magnetic recording layer according to embodiments of the present invention may have three ferromagnetic layers or more, which are provided with a soft magnetic layer interposed between respective ferromagnetic layers.

As described above, the patterned medium according to the present invention includes the soft magnetic layer 6 suppressing magnetic interaction between neighboring magnetic recording layers 200, thereby greatly reducing the switching field distribution of the patterned medium. Accordingly, according to the present invention, the recording reliability and the data stability of the patterned magnetic recording medium can be increased.

While the present invention has been particularly shown and described with reference to exemplary embodiments thereof, the exemplary embodiments are for the illustrative purpose only and not to limit the scope of the present invention. For example, a non-magnetic interlayer and/or soft magnetic underlayer may be provided under the magnetic recording layer 200 and the magnetic boundary layer 250 or the stacking number of the ferromagnetic layers, the non-magnetic layers, and the soft magnetic layer included in the magnetic recording layer 200 may be varied by one of ordinary skill in the art. Thus the scope of the present invention is not defined by the exemplary embodiments but by the technical scope of the following claims.

What is claimed is:

1. A patterned magnetic recording medium comprising:
   a plurality of patterned magnetic recording domains arranged at regular intervals on a substrate,
   wherein each of the magnetic recording domains is a multilayer laminate which is disposed vertically with respect to the substrate,
   wherein each respective one of the magnetic recording domains comprises:
   a first ferromagnetic layer;
   a second ferromagnetic layer; and
   a soft magnetic layer interposed between the first ferromagnetic layer and the second ferromagnetic layer;
   a first non-magnetic layer disposed between the first ferromagnetic layer and the soft magnetic layer; and
   a second non-magnetic layer disposed between the second ferromagnetic layer and the soft magnetic layer;
   wherein the soft magnetic layer suppresses magnetic interaction between the respective one of the magnetic recording domains and neighboring ones of the magnetic recording domains relative to magnetic interaction that would occur if the soft magnetic layer were not disposed in the respective one of the magnetic recording domains.

2. The patterned magnetic recording medium of claim 1, wherein the magnetic anisotropic energy of each one of the first and second ferromagnetic layers is $10^6$-$10^7$ erg/cm$^3$.

3. The patterned magnetic recording medium of claim 1, wherein the thickness of each one of the first and second ferromagnetic layers is 2-10 nm.

4. The patterned magnetic recording medium of claim 1, wherein the first and second ferromagnetic layers are each one of a CoCrPt layer, a CoPtP layer, a multi-layer comprising a Co layer and a Pt layer, and another multi-layer comprising a Fe layer and a Pt layer.

5. The patterned magnetic recording medium of claim 1, wherein the magnetic anisotropic energy of the soft magnetic layer is 50-10000 erg/cm$^3$.

6. The patterned magnetic recording medium of claim 1, wherein the thickness of soft magnetic layer is 2-10 nm.

7. The patterned magnetic recording medium of claim 1, wherein the soft magnetic layer is one of a CoFe layer, a NiFe layer, a CoNiFe layer, and a Co layer.

8. The patterned magnetic recording medium of claim 1, wherein 4 $\pi$Ms is 0.3-1.5 Tesla, where Ms is the saturation magnetization of the soft magnetic layer.

9. The patterned magnetic recording medium of claim 1, wherein the thickness of each one of the first and second non-magnetic layers is 1-5 nm.

10. The patterned magnetic recording medium of claim 1, wherein each one of the first and second non-magnetic layers is one of a Cu layer, a Pt layer, a Ru layer, a Ta layer, a NiFeCr layer, and a Cr layer.

11. The patterned magnetic recording medium of claim 1, wherein a maximum switching magnetic distribution of the patterned magnetic recording medium is less than 70%.

12. The patterned magnetic recording medium of claim 1, wherein a maximum switching magnetic distribution of the patterned magnetic recording medium is less than 38%.

13. The patterned magnetic recording medium of claim 1, wherein a maximum switching magnetic distribution of the patterned magnetic recording medium is less than 20%.

14. The patterned magnetic recording medium of claim 1, wherein 4 $\pi$Ms is 0.3-0.7 Tesla, where Ms is the saturation magnetization of the soft magnetic layer.

* * * * *